United States Patent

Groneberg et al.

[15] 3,659,930
[45] May 2, 1972

[54] SEGMENTED DEFLECTIBLE SCREEN SURFACE FOR TESTING EYES BY LASER REFRACTION

[72] Inventors: Horst E. Groneberg, Rochester; Kenneth A. Snow, Greece, both of N.Y.

[73] Assignee: Bausch & Lomb Incorporated, Rochester, N.Y.

[22] Filed: Sept. 28, 1970

[21] Appl. No.: 76,046

[52] U.S. Cl..................351/36, 350/295, 351/17, 351/32, 351/34, 351/37
[51] Int. Cl..........................A61b 3/02, G02b 5/02
[58] Field of Search.................351/1, 13, 17, 30, 32, 34, 351/36, 37, 39; 331/94.5; 350/295

[56] References Cited

UNITED STATES PATENTS

| | | | |
|---|---|---|---|
| 3,514,776 | 5/1970 | Mulready | 350/295 X |
| 2,952,189 | 9/1960 | Pajes | 350/295 |
| 3,254,342 | 5/1966 | Miller | 350/295 |

OTHER PUBLICATIONS

Oliver, Proceedings of the IEEE, Vol 51, Jan. 1963, pps. 220–221

Primary Examiner—David Schonberg
Assistant Examiner—Paul A. Sacher
Attorney—Frank C. Parker and Bernard D. Bogdon

[57] ABSTRACT

A deflectible generally circular screen for testing eyes by laser refraction includes a plurality of thin flexible generally triangularly shaped segments each having a nonspecular surface. The segments are affixed to a base and disposed to have corresponding apexes of the triangularly shaped segments defining a central area of the screen. The surface of each segment opposite the nonspecular surface is disposed to engage an inflatable rubber diaphragm to deflect the triangular segments from a generally concave disposition to a generally planar disposition. After the diaphragm is inflated to engage and cooperatively move the screen, the diaphragm is deflated at a relatively slow controlled rate and a visual pattern formed on the nonspecular surfaces of the segments of the screen by a laser beam appears to move to an observer having abnormal eyesight.

4 Claims, 5 Drawing Figures

Patented May 2, 1972

HORST E. GRONEBERG
KENNETH A. SNOW
  INVENTORS

BY

BERNARD D. BOGDON
  ATTORNEY

HORST E. GRONEBERG
KENNETH A. SNOW
INVENTORS

BY
BERNARD D. BOGDON
ATTORNEY

3,659,930

SEGMENTED DEFLECTIBLE SCREEN SURFACE FOR TESTING EYES BY LASER REFRACTION

BACKGROUND OF THE INVENTION

The present invention is related to the invention of an application assigned to Bausch & Lomb Incorporated entitled "Method Of And Apparatus For Testing Ametropia By Laser Refraction" Ser. No. 866,425 filed Oct. 6, 1969, now U.S. Pat. No. 3,572,912 by applicant H.A. Knoll.

1. Field of the Invention

This invention relates to an apparatus for testing eyes and more particularly to an ophthalmic instrument having a movable screen for aiding in the creation of visual patterns for the testing of eyes.

2. Brief Description of the Prior Art

In the hereinbefore mentioned patent by inventor H.A. Knoll there is disclosed the idea and practical embodiments of a rotating drum for use in combination with a coherent beam of visible light diffused to produce a visual pattern. The equipment, and in particular the screen and its driving mechanism, disclosed therein were relatively expensive to manufacture, at times difficult to manipulate and align and were generally of fairly detailed and complex structure. To obtain results from testing with a rotating drum, which are useful for determining conditions related to eyes having astigmatic conditions it was necessary, as described in FIG. 4 and in the body of the Knoll patent, to rotate the drum in a plane generally transversely disposed to the laser beam, to align an indicator with the apparent movement of the visual pattern appearing to the observer. Frequently the effects produced by the rotating drum apparatus were not great enough to finitely ascertain deficient eyesight conditions.

Known deflectible screens do not provide great enough describable effect when the visual granular pattern appears to move to an observer having abnormal eyesight. The observed granular flow is not nearly distinct enough and its direction of movement is generally difficult to ascertain by those being tested.

SUMMARY OF THE INVENTION

This invention provides a most useful uncomplicated apparatus, ideally suited for construction of practical embodiments relatively inexpensively, for use in testing eyes to determine abnormalities including ametropia and astigmatism, which overcomes the known deficiencies of prior art devices. A deflectible screen comprising a plurality of segments disposed to deflect readily to produce vivid granular flow patterns to an observer having abnormal eyesight when a laser beam is displayed upon nonspecular surfaces of the plurality of segments. Apparatus for deflecting the plurality of segments and for controlling the rate of deflection comprises a pneumatic device extremely sensitive, to change deflection of the segments quickly and minutely.

In testing, a person will observe the granular pattern separately with each of his two eyes and relate to an operator of the apparatus what he observes. If the eyesight of the observer is abnormal, he will in general observe the granular pattern moving. The pattern will appear to move inwardly, generally running into the center of the screen, if he is a myope. The converse is true, if the eyesight of the observer is hyperopic and under those conditions he will generally observe the pattern running outwardly from the center towards the periphery. The granular flow will appear to be uniform, absent any astigmatic condition in either eye of the observer. If an astigmatism exists, and depending upon the type of astigmatism, an irregular pattern will be evident to the observer in experiencing astigmatic conditions. The irregular pattern may comprise, for example, a granular flow pattern moving at a faster rate or slower rate than the balance of the total pattern, possibly in the same direction or even in the opposite direction to the balance of the flow pattern. It is also possible that only certain meridians will demonstrate a flow pattern and that the balance of the pattern will be stationary or generally just sparkling.

The operator of the equipment is able to correlate the described information with eyeglass lenses necessary to correct to normal the eyesight of the observer. A correcting prescription may be arrived at by introducing lenses and having the observer relate when the flow pattern is reduced to being stationary.

Regardless of the construction of the flexible screen apparatus, it is most desirable to maintain uniform deflection about a central point on the screen. Likewise any means, mechanical or otherwise, is suitable for deflecting the screen providing uniform deflection is provided for about the central point.

One specific advantage of this invention is that it enables those testing eyesight to obtain extremely accurate results, for the instrument is sensitive to within approximately one-twentieth of a diopter notwithstanding the fact that correction is generally made to within one-quarter of a diopter. Embodiments of the invention are less expensive and much more simple to operate and require less subjectivity on the part of the observer for he need only describe whether the pattern is moving or stationary. This feature is particularly important when testing illiterate people including children of a relatively young age.

DETAILED DESCRIPTION OF THE PREFERRED EMBODIMENT

Figure 1:
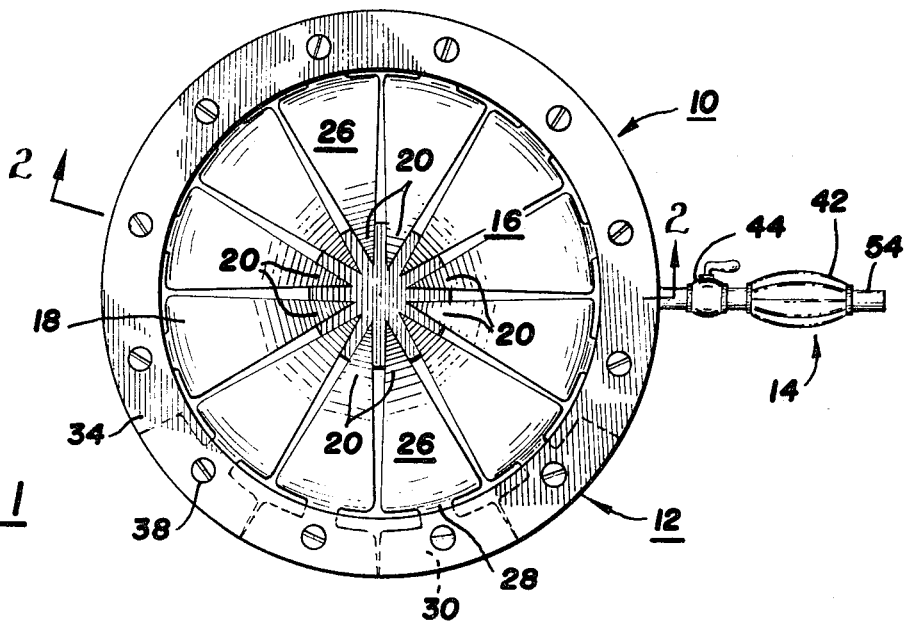
FIG. 1 is a plan view of a deflectible screen for testing eyes constructed according to the principles of the present invention.

A deflectible screen assembly 10 is shown in FIG. 1 and generally includes two sections, one of a screen apparatus 12 and the other of a pneumatic apparatus 14 for deflecting a screen 16 of the screen apparatus 12. The screen 16 comprises a plurality of generally thin flexible triangularly shaped vanes 18. The vanes 18 are disposed in a circular pattern, each having an apex area 20 disposed proximate and pointing toward the center of the formed circle. In the illustrated embodiment the screen 16 is formed of 12 wedge shaped or symmetrical triangular sections or vanes 18 each having an acute angle of approximately 30° disposed at the apex area 20. To provide for clearance between adjoining vanes 18 of the screen 16 during deflection, the vanes 18 are disposed radially outward from the center of the screen 16. The number of vanes 18 is somewhat arbitrary, however, extremely satisfactory results were obtained with as few as 12.

Figure 2:
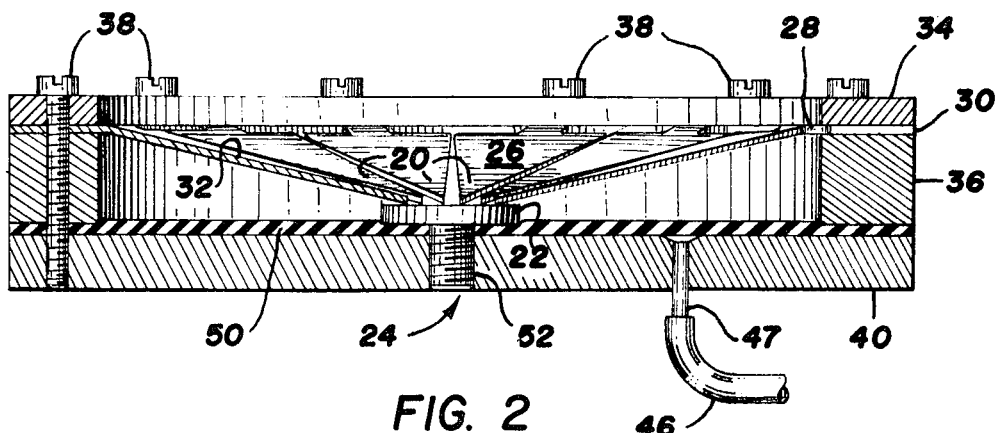
FIG. 2 is an enlarged partial cross-sectional view of the deflectible screen in FIG. 1 before deflection taken along the planes of skewed line 2—2 in FIG. 1.

It is evident from FIG. 2, which depicts the vanes 18, before deflection, disposed to form a recess, that the vanes 18 are bent downward to generally rest each apex area 20 upon a screw head 22 of a center screw 24. Each vane 18 is defined by the apex area 20, a general body area 26, a trunk portion 28 and a base portion 30. If the vane 18 is oriented with the base portion 30 downward, each appears quite like a profile of a traditional Christmas tree, as typically shown in FIG. 1.

Figure 3:
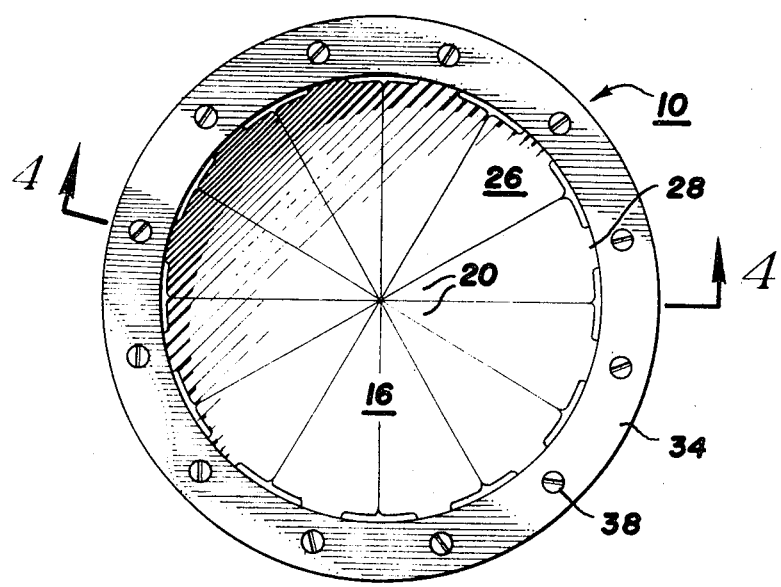
FIG. 3 is a plan view of the deflectible screen of FIG. 1 after deflection.
Figure 4:
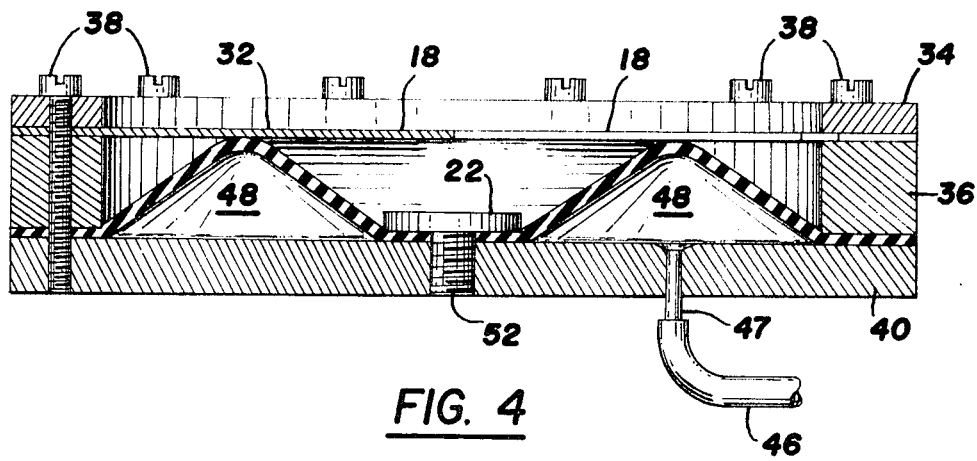
FIG. 4 is an enlarged partial cross-sectional view of the deflectible screen of FIG. 1 taken along the planes of skewed line 4—4 in FIG. 3.

As best seen in FIG. 2, each vane 18 is bent downward at the trunk portion 28 which is considerably less broad than is the body area 26 at that portion of each vane 18. The breadth of the trunk portion 28 provides for a relatively uniform rate of deflection of each vane 18 from its recessed disposition, as shown in FIG. 2, to its planar disposition, as shown in FIGS. 3 and 4, and even for deflection beyond to a slightly mounded or convex disposition. A material satisfactory for forming the vanes might include, for example, stainless steel either painted or finished to have a nonspecular surface on a front side 32 of each vane 18 at its apex and body areas 20 and 26, respectively. Stainless steel is resilient with a suitable memory for each vane 18 to return to its rest position atop the center screw head 22 after deflection. Since the vanes 18 are mounted to clear each other during deflection, it will be appreciated, even though it is not shown in FIG. 3, that there is a spacing of a few thousandths of an inch between each pair of juxtaposed sides of the vanes 18.

A circular flat retaining ring 34 is provided to secure each vane 18 at its base portion 30 to a fixture body 36 having a plurality of machine screws 38 passing through clearance holes in the retaining ring 34 and the vanes 18 to threadingly engage a fixture base 40 at a plurality of apertures corresponding to each machine screw 38 at each one of the 12 vanes 18. The retaining ring 34, the fixture body 36 and the fixture base 40 are formed of any suitable material for remaining rigid to preclude deflection of each vane base portion 30 relative to the fixture base 40.

The pneumatic apparatus 14 for deflecting the screen 16 of the screen apparatus 12 comprises, as best seen in FIG. 1, a flexible hand pump 42 of the bellows type, in communication with a control valve 44 engaging conduit 46 connected to a port tube 47, for providing communication with an air chamber 48, as defined in FIG. 4 by a rubber diaphragm 50 and the fixture base 40. In FIG. 1 the screen 16 is at its recessed disposition or at rest, for the air chamber 48 is deflated, as best seen in FIG. 2. The rubber diaphragm 50 is generally circular and its periphery is sandwiched between the fixture body 36 and the fixture base 40 and slightly compressed by means of the machine screws 38 threadingly engaging the fixture base 40 to form a fluid tight seal. In addition, the rubber diaphragm 50 has a central aperture for passing therethrough a threaded shank 52 of the center screw 24 threadingly engaging the fixture base 40. The diaphragm 50 is restrained by the center screw's circular head 22 and the generally circular fixture body 36. When inflated by manipulation of the hand pump 42 the diaphragm 50 is urged to form a generally annularly configured air chamber 48, as best seen in FIG. 4.

Figure 5:
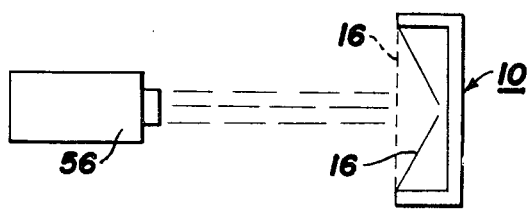
FIG. 5 is a schematic illustration of a laser displaying a coherent beam of visible light upon a deflectable screen according to the principles deflectible the present invention.

In operation, the vanes 18 of the screen 16 are deflected from the recessed disposition, as shown in FIG. 2, to at least the planar disposition, as shown in FIG. 3 and FIG. 4 and as schematically illustrated by the broken lines in FIG. 5, by urging of the rubber diaphragm 50 against the vane surface opposite the nonspecular vane surface, as the hand pump 42 is repeatedly manipulated to pump air through the control valve 44 into the air chamber 48. After the vanes 18 are disposed generally planar or slightly convex at their front or nonspecular surface, to define a generally continuous nonspecular screen 16, the control valve 44 is adjusted to provide for exiting air from the air chamber 48, through the hand pump 42 and out an exit tube 54, in communication with the hand pump 42 and the atmosphere. The control valve 44 is extremely sensitive and in cooperation with the rubber diaphragm 50 controls and provides for a relatively uniform rate of deflation of the air chamber 48.

Once the screen 16 is generally planar, as shown in FIG. 3, and a laser beam is splayed against the nonspecular surface of the screen 16, for example, as shown in FIG. 5 by a schematically illustrated laser 56, the control valve 44 is operated to uniformly deflate the air chamber 48 to provide for uniform angular displacement of the vanes 18 from the planar disposition of FIG. 3 to the recess disposition of FIG. 1. During the course of movement of the vanes 18 from the schematically illustrated broken line planar position of FIG. 5 to the concave solid line position of FIG. 5 to look like that illustrated in FIG. 1, an observer having abnormal eyesight will view a granular flow pattern as hereinbefore explained. It will be appreciated that the observed flow pattern will be a function of the abnormalities present in any one observer's eyes. In all cases, however, the pattern is describable and the information provided can be evaluated to ascertain the eyesight deficiencies. Likewise, introducing lenses of known curvatures between the observer and the apparent flow pattern, until the flow pattern appears to be stationary, an operator or technician can prescribe corrective optical lenses for the observer, to correct his eyesight to a normal standard.

What is claimed is:

1. In an apparatus for testing eyes including a source of a continuous coherent beam of visible light, a screen having a deflectible screen surface located in view of the eyes being tested onto which the continuous coherent beam of visible light is projected, means for diffusing the beam of continuous coherent visible light to produce a visual pattern appearing on the screen surface, and means for moving the screen surface to produce an apparent movement of the visual pattern for eyes having abnormal refractive conditions, an improved screen having a deflectible screen surface, wherein the improvement comprises:

a screen defined by a plurality of individual equally spaced flexible segments, each segment separated from any other segment at least at the screen surface and each segment extending generally from the central area of the screen to generally the periphery of the screen, each of the segments defining a substantially greater screen surface area proximate the periphery of the screen than at the central area of the screen.

2. In the apparatus for testing eyes, as defined in claim 1, including the improved screen, an improvement for moving the screen surface, wherein the improvement comprises:

pneumatic means for deflecting the centrally disposed area of the deflectible screen surface, relative to the periphery of the screen.

3. The apparatus for testing eyes, as defined in claim 2, wherein the pneumatic means for deflecting the screen surface, comprises:

a diaphragm disposed for deflecting the screen surface in either of two generally opposed directions.

4. The apparatus for testing eyes, as defined in claim 3, wherein, the pneumatic means includes:

a pump in communication with a fluid chamber defined by a housing and the diaphragm.

* * * * *